US012164736B2

United States Patent
Hasegawa

(10) Patent No.: US 12,164,736 B2
(45) Date of Patent: Dec. 10, 2024

(54) CONDUCTIVE MEMBER FOR TOUCH PANEL HAVING A PLURALITY OF THIN METAL WIRES WITH DIFFERENT INTERVALS AND TOUCH PANEL DISPLAY DEVICE THEREOF

(71) Applicant: FUJIFILM Corporation, Tokyo (JP)

(72) Inventor: Kazuhiro Hasegawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/339,725

(22) Filed: Jun. 22, 2023

(65) Prior Publication Data

US 2023/0333700 A1    Oct. 19, 2023

Related U.S. Application Data

(63) Continuation of application No. PCT/JP2021/044136, filed on Dec. 1, 2021.

(30) Foreign Application Priority Data

Dec. 23, 2020   (JP) .................................. 2020-213119

(51) Int. Cl.
  *G06F 3/044*   (2006.01)
(52) U.S. Cl.
  CPC .......... *G06F 3/0446* (2019.05); *G06F 3/0445* (2019.05); *G06F 2203/04112* (2013.01)
(58) Field of Classification Search
  CPC .................................................... G06F 3/0446
  (Continued)

(56) References Cited

U.S. PATENT DOCUMENTS

2016/0370916 A1    12/2016   Hashimoto et al.
2017/0199599 A1*    7/2017   Takahashi ............. G06F 3/0445
(Continued)

FOREIGN PATENT DOCUMENTS

JP          2014-071865 A       4/2014
JP          2015-069611 A       4/2015
(Continued)

OTHER PUBLICATIONS

International Search Report issued in PCT/JP2021/044136 on Mar. 8, 2022.
(Continued)

*Primary Examiner* — Long D Pham
(74) *Attorney, Agent, or Firm* — Edwards Neils LLC; Jean C. Edwards, Esq.

(57) ABSTRACT

A conductive member for a touch panel, a touch panel, and a touch panel display device maintains image quality visually recognized upon disposition and use on a display module even if a positional deviation occurs between a first and second mesh-shaped electrode. The conductive member for a touch panel includes a first and second mesh-shaped electrode, the first mesh-shaped electrode includes a plurality of first and second thin metal wires, the second intersecting the first thin metal wires, the second mesh-shaped electrode includes a plurality of third and fourth thin metal wires, the fourth thin metal wires intersecting the third, and an interval between the first and third thin metal wires continuously changes, or an interval between the second and fourth thin metal wires continuously changes, or the interval between the first and third thin metal wires and the interval between the second and fourth thin metal wires continuously change.

20 Claims, 6 Drawing Sheets

(58) Field of Classification Search
USPC .......................................................... 345/174
See application file for complete search history.

(56) References Cited

U.S. PATENT DOCUMENTS

| | | |
|---|---|---|
| 2017/0221196 A1 | 8/2017 | Yamaguchi et al. |
| 2019/0018524 A1* | 1/2019 | Shiojiri ................. G06F 3/0446 |
| 2021/0064106 A1 | 3/2021 | Katsuyama et al. |

FOREIGN PATENT DOCUMENTS

| | | |
|---|---|---|
| JP | 2015-106342 A | 6/2015 |
| JP | 2015-210600 A | 11/2015 |
| JP | 2016-081257 A | 5/2016 |
| JP | 2016-103202 A | 6/2016 |
| JP | 2017-182213 A | 10/2017 |
| JP | 2017-182669 A | 10/2017 |
| JP | 2019-204502 A | 11/2019 |

OTHER PUBLICATIONS

Written Opinion issued in PCT/JP2021/044136 on Mar. 8, 2022.
International Preliminary Report on Patentability completed by WIPO on Oct. 18, 2022 in connection with International Patent Application No. PCT/JP2021/044136.

\* cited by examiner

CONDUCTIVE MEMBER FOR TOUCH PANEL HAVING A PLURALITY OF THIN METAL WIRES WITH DIFFERENT INTERVALS AND TOUCH PANEL DISPLAY DEVICE THEREOF

CROSS-REFERENCE TO RELATED APPLICATIONS

This application is a Continuation of PCT International Application No. PCT/JP2021/044136 filed on Dec. 1, 2021, which was published under PCT Article 21 (2) in Japanese, and which claims priority under 35 U.S.C. § 119 (a) to Japanese Patent Application No. 2020-213119 filed on Dec. 23, 2020. The above applications are hereby expressly incorporated by reference, in their entirety, into the present application.

BACKGROUND OF THE INVENTION

1. Field of the Invention

The present invention relates to a conductive member for a touch panel, to be used as an electrode for detecting a touch operation.

The present invention also relates to a touch panel including the conductive member for a touch panel.

The present invention further relates to a touch panel display device including the touch panel.

2. Description of the Related Art

Conventionally, in various electronic devices including portable information devices such as tablet computers and smartphones, touch panel display devices have been used in which an input operation to the electronic device can be performed by a so-called touch operation of bringing a finger, a stylus pen, or the like, into contact with or close to a screen.

Such a touch panel display device has a conductive member in which a detector for detecting a touch operation is formed.

The detector may be formed of a transparent conductive oxide such as indium tin oxide (ITO), but may be formed of an opaque conductive material such as a metal other than the transparent conductive oxide. The opaque conductive material such as a metal has advantages such as easy patterning, excellent bendability, and lower resistance as compared to the above-described transparent conductive oxide.

For example, JP2015-210600A describes a conductive member made of a metal as an opaque conductive material. The conductive member of JP2015-210600A includes a substrate having a first surface and a second surface; a plurality of first mesh-shaped electrodes formed on the first surface, arranged at intervals along a first arrangement direction, and extending along a second arrangement direction orthogonal to the first arrangement direction; and a plurality of second mesh-shaped electrodes formed on the second surface of the substrate, arranged at intervals along the second arrangement direction, and extending along the first arrangement direction. The first mesh-shaped electrode is formed in a mesh shape by a plurality of first main lines and a plurality of first sub-lines intersecting the first main lines, and the second mesh-shaped electrode is formed in a mesh shape by a plurality of second main lines parallel to the first main lines and a plurality of second sub-lines parallel to the first sub-lines.

SUMMARY OF THE INVENTION

In the conductive member disclosed in JP2015-210600A, the first mesh-shaped electrode and the second mesh-shaped electrode are disposed so as to overlap each other with the substrate interposed therebetween. Each of the first mesh-shaped electrode and the second mesh-shaped electrode can be produced by using, for example, a so-called photolithography process. However, in the producing process, a positional deviation may occur between the first mesh-shaped electrode and the second mesh-shaped electrode for some reason. In the touch panel using the conventional fixed mesh-shaped electrodes, the first mesh-shaped electrode and the second mesh-shaped electrode are overlapped at a ½ pitch of the mesh, but if such a positional deviation occurs, when the conductive member is disposed on a display module, moire caused by interference between a mesh pattern formed by overlapping the first mesh-shaped electrode and the second mesh-shaped electrode and a pixel pattern of the display module, and unevenness in image density of the display module visually recognized via the conductive member are likely to occur, and the quality of an image visually recognized via the conductive member may be deteriorated.

The present invention is made to solve such a conventional problem, and an object of the present invention is to provide a conductive member for a touch panel capable of maintaining image quality visually recognized upon disposition and use on a display module even if a positional deviation occurs between a first mesh-shaped electrode and a second mesh-shaped electrode.

Another object of the present invention is to provide a touch panel including the conductive member for a touch panel.

Still another object of the present invention is to provide a touch panel display device including the touch panel.

A conductive member for a touch panel according to the present invention includes a transparent insulating member; and a first mesh-shaped electrode and a second mesh-shaped electrode disposed so as to face each other with the transparent insulating member interposed therebetween. The first mesh-shaped electrode consists of a plurality of first thin metal wires extending along a predetermined first direction and arranged in a direction orthogonal to the first direction, and a plurality of second thin metal wires extending along a second direction different from the first direction, arranged in a direction orthogonal to the second direction, and intersecting the plurality of first thin metal wires. The second mesh-shaped electrode consists of a plurality of third thin metal wires extending along the first direction and arranged in the direction orthogonal to the first direction, and a plurality of fourth thin metal wires extending along the second direction, arranged in a direction orthogonal to the second direction, and intersecting the plurality of third thin metal wires. In plan view, the first thin metal wires and the third thin metal wires are alternately disposed in the direction orthogonal to the first direction, and the second thin metal wires and the fourth thin metal wires are alternately disposed in the direction orthogonal to the second direction. An interval between the first thin metal wire and the third thin metal wire adjacent to each other along the direction orthogonal to the first direction continuously changes along the direction orthogonal to the first direction; or an interval between the second thin metal wire and the fourth thin metal wire adjacent to each other along the direction orthogonal to the second direction continuously changes along the direction orthogonal to the second direction; or the interval between the first thin metal wire and the third thin metal wire adjacent to each other along the direction orthogonal to the first direction continuously changes along the direction orthogonal to the first direction, and the interval between the second thin metal wire and the fourth thin metal wire adjacent to each other along the direction orthogonal to the second direction continuously changes along the direction orthogonal to the second direction.

The interval between the first thin metal wire and the third thin metal wire adjacent to each other along the direction orthogonal to the first direction can change monotonously along the direction orthogonal to the first direction.

Alternatively, the interval between the first thin metal wire and the third thin metal wire adjacent to each other along the direction orthogonal to the first direction can change so that a monotonous increase and a monotonous decrease continue along the direction orthogonal to the first direction.

The interval between the second thin metal wire and the fourth thin metal wire adjacent to each other along the direction orthogonal to the second direction can change monotonously along the direction orthogonal to the second direction.

The interval between the second thin metal wire and the fourth thin metal wire adjacent to each other along the direction orthogonal to the second direction can change so that a monotonous increase and a monotonous decrease continue along the direction orthogonal to the second direction.

A difference between a maximum value and a minimum value of the interval between the first thin metal wire and the third thin metal wire, the interval which continuously changes in the direction orthogonal to the first direction, is preferably 1/30 or more and 1/2 or less of a mean value of the interval.

Additionally, a difference between a maximum value and a minimum value of the interval between the second thin metal wire and the fourth thin metal wire, the interval which continuously changes in the direction orthogonal to the second direction, is preferably 1/30 or more and 1/2 or less of a mean value of the interval.

The plurality of first thin metal wires can be arranged at a predetermined first pitch in the direction orthogonal to the first direction, and the plurality of third thin metal wires can be arranged at a third pitch different from the first pitch in the direction orthogonal to the first direction.

Alternatively, at least one of an arrangement interval between the first thin metal wires adjacent to each other along the direction orthogonal to the first direction or an arrangement interval between the third thin metal wires adjacent to each other along the direction orthogonal to the first direction can continuously change along the direction orthogonal to the first direction.

The plurality of second thin metal wires can be arranged at a predetermined second pitch in the direction orthogonal to the second direction, and the plurality of fourth thin metal wires can be arranged at a fourth pitch different from the second pitch in the direction orthogonal to the second direction.

Alternatively, at least one of an arrangement interval between the second thin metal wires adjacent to each other along the direction orthogonal to the second direction or an arrangement interval between the fourth thin metal wires adjacent to each other along the direction orthogonal to the second direction can continuously change along the direction orthogonal to the second direction.

An intersecting angle between the first direction and the second direction may be 60° or more and 80° or less.

The first thin metal wire can have a linear shape between intersections with two of the second thin metal wires adjacent to each other, the second thin metal wire can have a linear shape between intersections with two of the first thin metal wires adjacent to each other, the third thin metal wire can have a linear shape between intersections with two of the fourth thin metal wires adjacent to each other, and the fourth thin metal wire can have a linear shape between intersections with two of the third thin metal wires adjacent to each other.

Alternatively, the first thin metal wire can have a curved shape between intersections with two of the second thin metal wires adjacent to each other, the second thin metal wire can have a curved shape between intersections with two of the first thin metal wires adjacent to each other, the third thin metal wire can have a curved shape between intersections with two of the fourth thin metal wires adjacent to each other, and the fourth thin metal wire can have a curved shape between intersections with two of the third thin metal wires adjacent to each other.

The transparent insulating member can consist of a transparent substrate.

Alternatively, the transparent insulating member may consist of an insulating layer, the conductive member for a touch panel may further include a transparent substrate, and the first mesh-shaped electrode, the second mesh-shaped electrode, and the insulating layer may be disposed on one surface of the transparent substrate.

Additionally, the transparent substrate is preferably a flexible film.

A touch panel according to the present invention includes the above-described conductive member for a touch panel.

A touch panel display device according to the present invention includes the above-described touch panel; and a display module.

According to the present invention, a conductive member for a touch panel includes a first mesh-shaped electrode and a second mesh-shaped electrode disposed so as to face each other with a transparent insulating member interposed therebetween. The first mesh-shaped electrode consists of a plurality of first thin metal wires extending along a predetermined first direction and arranged in a direction orthogonal to the first direction, and a plurality of second thin metal wires extending along a second direction different from the first direction, arranged in a direction orthogonal to the second direction, and intersecting the plurality of first thin metal wires. The second mesh-shaped electrode consists of a plurality of third thin metal wires extending along the first direction and arranged in the direction orthogonal to the first direction, and a plurality of fourth thin metal wires extending along the second direction, arranged in a direction orthogonal to the second direction, and intersecting the plurality of third thin metal wires. In plan view, the first thin metal wires and the third thin metal wires are alternately disposed in the direction orthogonal to the first direction, and the second thin metal wires and the fourth thin metal wires are alternately disposed in the direction orthogonal to the second direction. An interval between the first thin metal wire and the third thin metal wire adjacent to each other along the direction orthogonal to the first direction continuously changes along the direction orthogonal to the first direction; or an interval between the second thin metal wire and the fourth thin metal wire adjacent to each other along the direction orthogonal to the second direction continuously changes along the direction orthogonal to the second direction; or the interval between the first thin metal wire and the third thin metal wire adjacent to each other along the direction orthogonal to the first direction continuously changes along the direction orthogonal to the first direction, and the interval between the second thin metal wire and the fourth thin metal wire adjacent to each other along the direction orthogonal to the second direction continuously changes along the direction orthogonal to the second direction. Accordingly, it is possible to maintain image quality visually recognized upon disposition and use on a display module even if a positional deviation occurs between the first mesh-shaped electrode and the second mesh-shaped electrode.

DESCRIPTION OF THE PREFERRED EMBODIMENTS

Hereinafter, a conductive member for a touch panel and a touch panel according to the present invention will be described in detail based on preferred embodiments illustrated in the accompanying drawings.

In the following description, the expression "to" indicating a numerical range includes numerical values written on both sides of "to". For example, "s is a numerical value t1 to a numerical value t2" means that the range of s is a range including the numerical value t1 and the numerical value t2, and is t1≤s≤t2 in mathematical symbols.

Angles including "orthogonal", "parallel", and the like, include error ranges generally accepted in the technical field unless otherwise specified.

"Transparent" means that the light transmittance is at least 40% or more, preferably 75% or more, more preferably 80% or more, and further preferably 90% or more in the visible light wavelength range of wavelengths 400 nm to 800 nm.

The transmittance is measured by using "Plastics-Determination of total luminous transmittance and reflectance" prescribed in JIS K 7375:2008.

Embodiment 1

Figure 1:
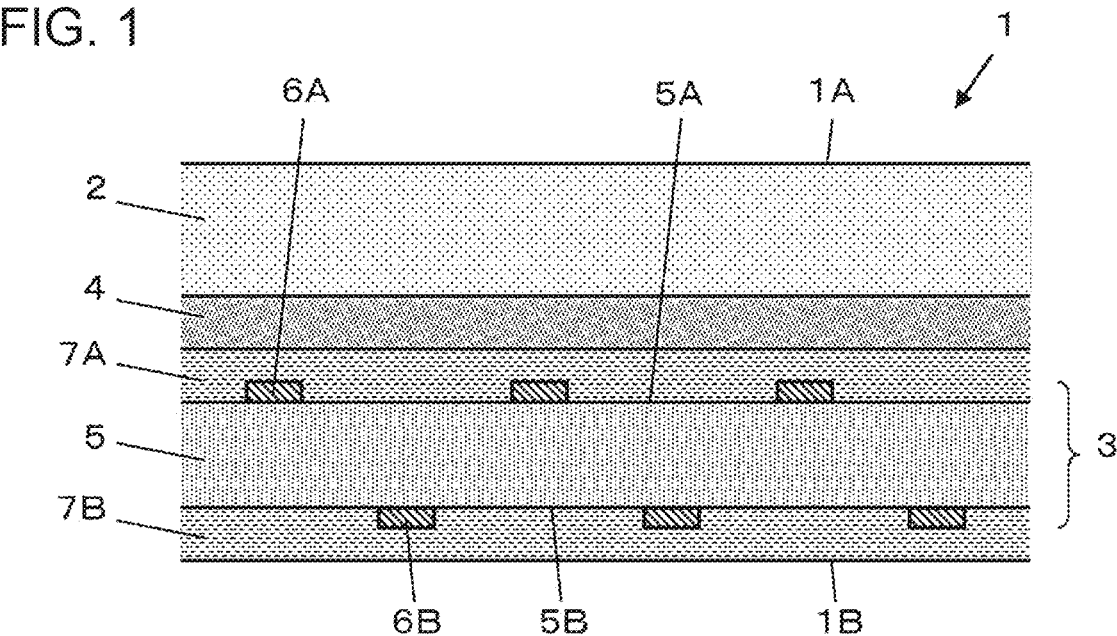
FIG. 1 is a partial cross-sectional view of a touch panel according to Embodiment 1.

FIG. 1 illustrates a configuration of a touch panel 1 according to Embodiment 1 of the present invention.

The touch panel 1 has a front surface 1A and a back surface 1B, and is used in a state in which a display module (not illustrated) having a liquid crystal display or the like is disposed on a back surface 1B side. The front surface 1A of the touch panel 1 is a touch detection surface, and is a viewing side on which an operator of the touch panel 1 observes an image displayed on a display device through the touch panel 1.

The touch panel 1 has a transparent insulating cover panel 2 disposed on a front surface 1A side, and a conductive member 3 for a touch panel is joined onto a surface of the cover panel 2 on a side opposite to the front surface 1A with a transparent adhesive 4.

The conductive member 3 for a touch panel has a transparent substrate 5, a first conductive layer 6A formed on one surface 5A of the transparent substrate 5 and patterned, and a second conductive layer 6B formed on the other surface 5B of the transparent substrate 5 and patterned. In this way, the first conductive layer 6A and the second conductive layer 6B face each other with the transparent substrate 5 interposed therebetween. Also, as illustrated in FIG. 1, an insulating layer 7A may be disposed so as to cover the first conductive layer 6A for the purpose of protecting the patterned first conductive layer 6A or for the purpose of planarization. Further, an insulating layer 7B may be disposed so as to cover the second conductive layer 6B for the purpose of protecting the patterned second conductive layer 6B or for the purpose of planarization.

Figure 2:
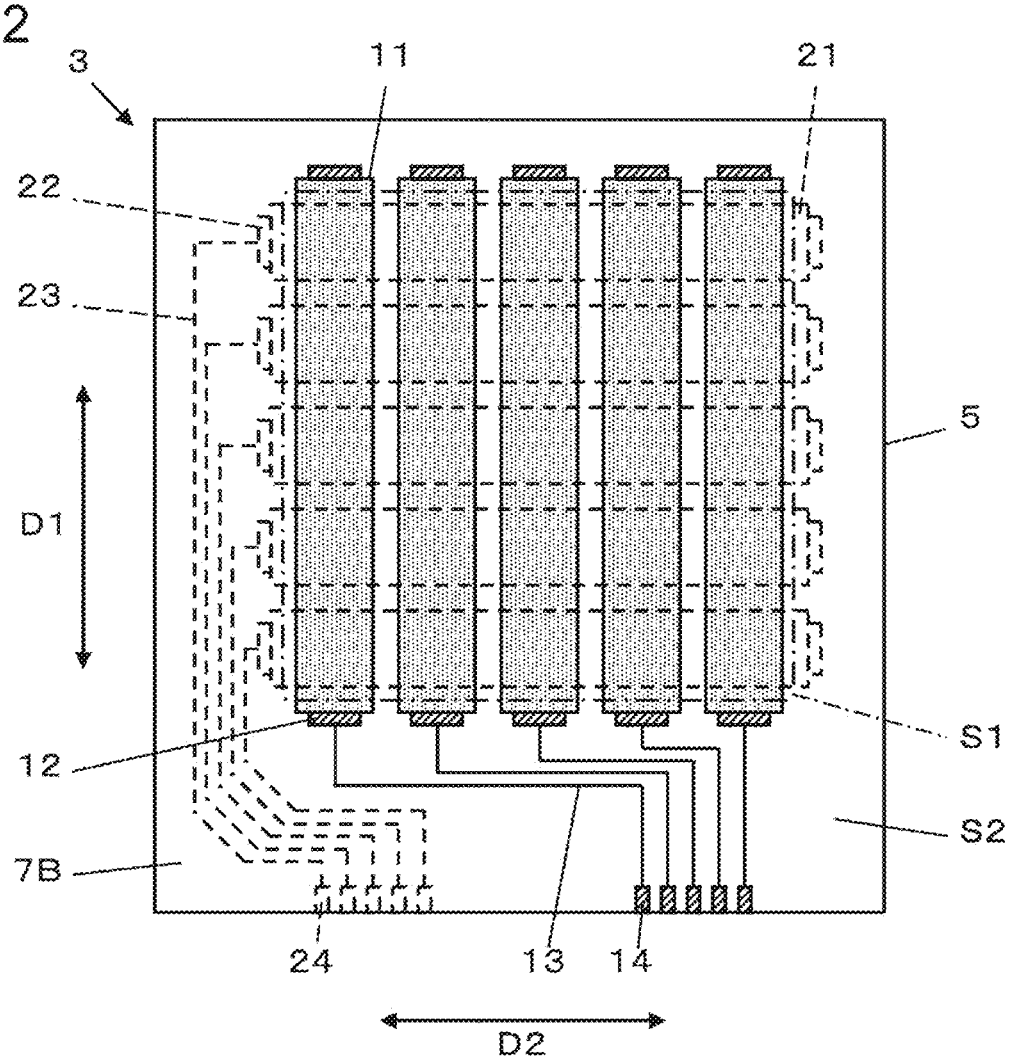
FIG. 2 is a plan view of a conductive member for a touch panel according to Embodiment 1.

FIG. 2 is a plan view of the conductive member 3 for a touch panel. The conductive member 3 for a touch panel is partitioned into a transmissive region S1 for detecting a touch operation with a finger, a stylus pen, and the like, and a peripheral region S2 that is a region on an outer side of the transmissive region S1 for disposing peripheral wires or the like connected to the display module (not illustrated).

In the first conductive layer 6A and the second conductive layer 6B, electrodes for detecting a touch operation, peripheral wires connected thereto, and the like, are patterned. Of the first conductive layer 6A and the second conductive layer 6B, the first conductive layer 6A located on a cover panel 2 side, that is, located on the viewing side has a plurality of first mesh-shaped electrodes 11 extending along a predetermined first direction D1 and arranged at intervals in a second direction D2 orthogonal to the first direction D1. Each of the plurality of first mesh-shaped electrodes 11 has a first pad 12 at an end portion thereof.

Also, the first conductive layer 6A has a plurality of first peripheral wires 13 led from the plurality of first pads 12 of the plurality of first mesh-shaped electrodes 11, and a plurality of first external connection terminals 14 connected to the plurality of respective first peripheral wires 13.

The second conductive layer 6B located on a back surface 1B side of the touch panel 1 has a plurality of second mesh-shaped electrodes 21 extending along the second direction D2 and arranged at intervals in the first direction D1. Each of the plurality of second mesh-shaped electrodes 21 has a second pad 22 at an end portion thereof.

Also, the second conductive layer 6B has a plurality of second peripheral wires 23 led from the plurality of second pads 22 of the plurality of second mesh-shaped electrodes 21, and a plurality of second external connection terminals 24 connected to the plurality of respective second peripheral wires 23.

Here, the plurality of first mesh-shaped electrodes 11 of the first conductive layer 6A and the plurality of second mesh-shaped electrodes 21 of the second conductive layer 6B are disposed in the transmissive region S1 partitioned in the conductive member 3 for a touch panel.

Also, the plurality of first pads 12, the plurality of first peripheral wires 13, and the plurality of first external connection terminals 14 of the first conductive layer 6A, and the plurality of second pads 22, the plurality of second peripheral wires 23, and the plurality of second external connection terminals 24 of the second conductive layer 6B are disposed in the peripheral region S2 partitioned in the conductive member 3 for a touch panel.

Figure 3:
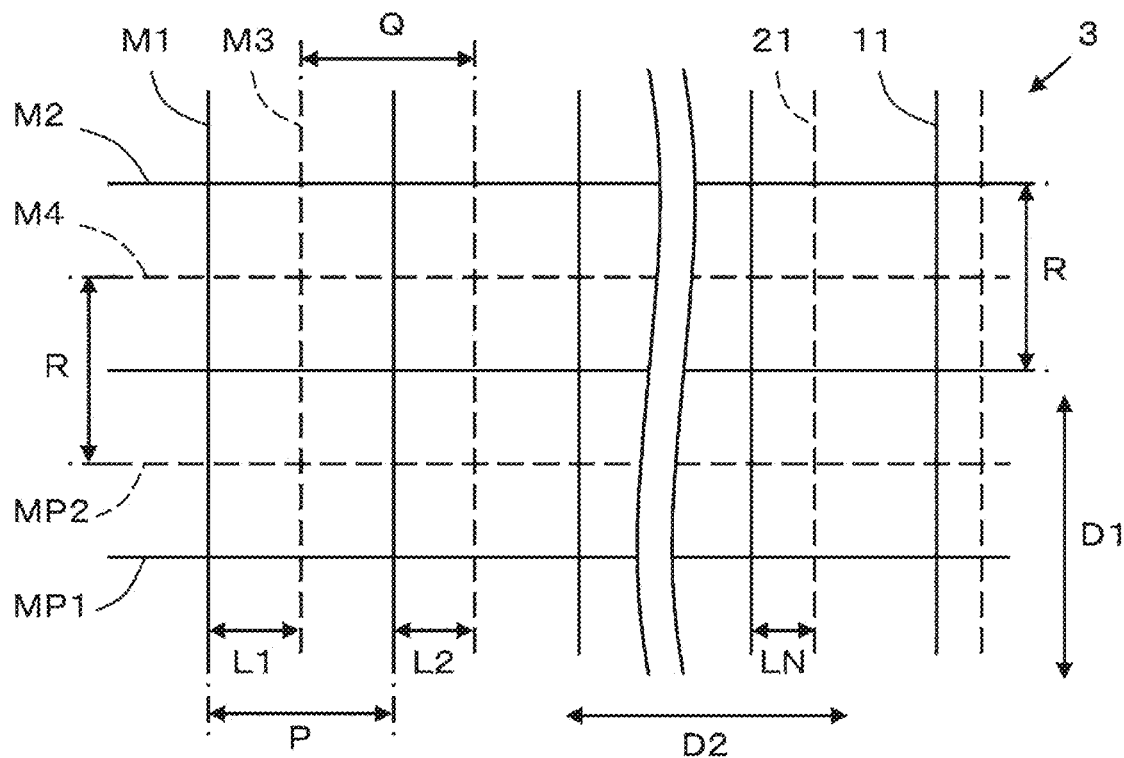
FIG. 3 is a partially enlarged plan view of the conductive member for a touch panel in an intersection region where a first mesh-shaped electrode and a second mesh-shaped electrode overlap each other according to Embodiment 1.

FIG. 3 is a partially enlarged plan view of the conductive member 3 for a touch panel in an intersection region where the first mesh-shaped electrode 11 and the second mesh-shaped electrode 21 overlap each other.

The first mesh-shaped electrode 11 consists of a plurality of first thin metal wires M1 extending along the first direction D1 and arranged in the second direction D2, and a plurality of second thin metal wires M2 extending along the second direction D2, arranged in the first direction D1, and intersecting the plurality of first thin metal wires M1. The plurality of first thin metal wires M1 are arranged at a constant pitch P from each other, and the plurality of second thin metal wires M2 are arranged at a constant pitch R from each other. In this way, in the first mesh-shaped electrode 11, the plurality of first thin metal wires M1 and the plurality of second thin metal wires M2 form a first mesh pattern MP1 having a plurality of quadrangular opening portions.

Here, the pitch P of the plurality of first thin metal wires M1 is defined by an arrangement interval of the plurality of first thin metal wires M1 in a direction orthogonal to the first direction D1 in which the first thin metal wires M1 extend, that is, in the second direction D2. Also, the pitch R of the plurality of second thin metal wires M2 is defined by an arrangement interval of the plurality of second thin metal wires M2 in a direction orthogonal to the second direction D2 in which the second thin metal wires M2 extend, that is, in the first direction D1.

The second mesh-shaped electrode 21 consists of a plurality of third thin metal wires M3 extending along the first direction D1 and arranged in the second direction D2, and a plurality of fourth thin metal wires M4 extending along the second direction D2, arranged along the first direction D1, and intersecting the plurality of third thin metal wires M3. The plurality of third thin metal wires M3 are arranged at a constant pitch Q narrower than the pitch P of the plurality of first thin metal wires M1, and the plurality of fourth thin metal wires M4 are arranged at the same pitch R as the pitch R of the plurality of second thin metal wires M2. In this way, in the second mesh-shaped electrode 21, the plurality of third thin metal wires M3 and the plurality of fourth thin metal wires M4 form a second mesh pattern MP2 having a plurality of quadrangular opening portions.

Here, the pitch Q of the plurality of third thin metal wires M3 is defined by an arrangement interval of the plurality of third thin metal wires M3 in the direction orthogonal to the first direction D1 in which the third thin metal wires M3 extend, that is, in the second direction D2. The pitch R of the plurality of fourth thin metal wires M4 is defined by an arrangement interval of the plurality of fourth thin metal wires M4 in the direction orthogonal to the second direction D2 in which the fourth thin metal wires M4 extend, that is, in the first direction D1.

As described above, in plan view, since the first thin metal wires M1 and the third thin metal wires M3 are parallel to each other, and the second thin metal wires M2 and the fourth thin metal wires M4 are parallel to each other, the first mesh-shaped electrode 11 and the second mesh-shaped electrode 21 overlap each other, the first thin metal wires M1 and the third thin metal wires M3 are alternately disposed in the second direction D2, and the second thin metal wires M2 and the fourth thin metal wires M4 are alternately disposed in the first direction D1. Accordingly, the first mesh pattern MP1 of the first mesh-shaped electrode 11 and the second mesh pattern MP2 of the second mesh-shaped electrode 21 overlap each other, and a mesh pattern having a plurality of quadrangular opening portions is formed.

Here, the interval between the first thin metal wire M1 and the third thin metal wire M3 adjacent to each other in plan view is defined as the interval between the first thin metal wire M1 and the third thin metal wire M3 adjacent to constantly the same side of both sides of the first thin metal wire M1.

In the example illustrated in FIG. 3, the interval between the first thin metal wire M1 and the third thin metal wire M3 adjacent to the first thin metal wire M1 on the right side in the second direction D2 is defined as the interval between the first thin metal wire M1 and the third thin metal wire M3 adjacent to each other in plan view, and the first thin metal wires M1 serving as the references of the intervals are assigned with arrangement numbers 1, 2, . . . , and N from the left toward the right. Since the pitch Q of the plurality of third thin metal wires M3 is narrower than the pitch P of the plurality of first thin metal wires M1, intervals L1, L2, . . . , and LN with respect to the first thin metal wires M1 assigned with the arrangement numbers 1, 2, . . . , and N become narrower as the arrangement number becomes larger, that is, as the position becomes closer to the right side along the second direction D2, and the value changes so as to monotonously decrease.

Here, as illustrated in FIG. 1, as a method of producing the conductive member 3 for a touch panel so that the first conductive layer 6A is disposed on the one surface 5A of the transparent substrate 5 and the second conductive layer 6B is disposed on the other surface 5B, for example, a so-called photolithography process or the like is used, but the first mesh pattern MP1 in the first conductive layer 6A and the second mesh pattern MP2 in the second conductive layer 6B may be deviated from each other for some reason in the producing process.

Figure 4:
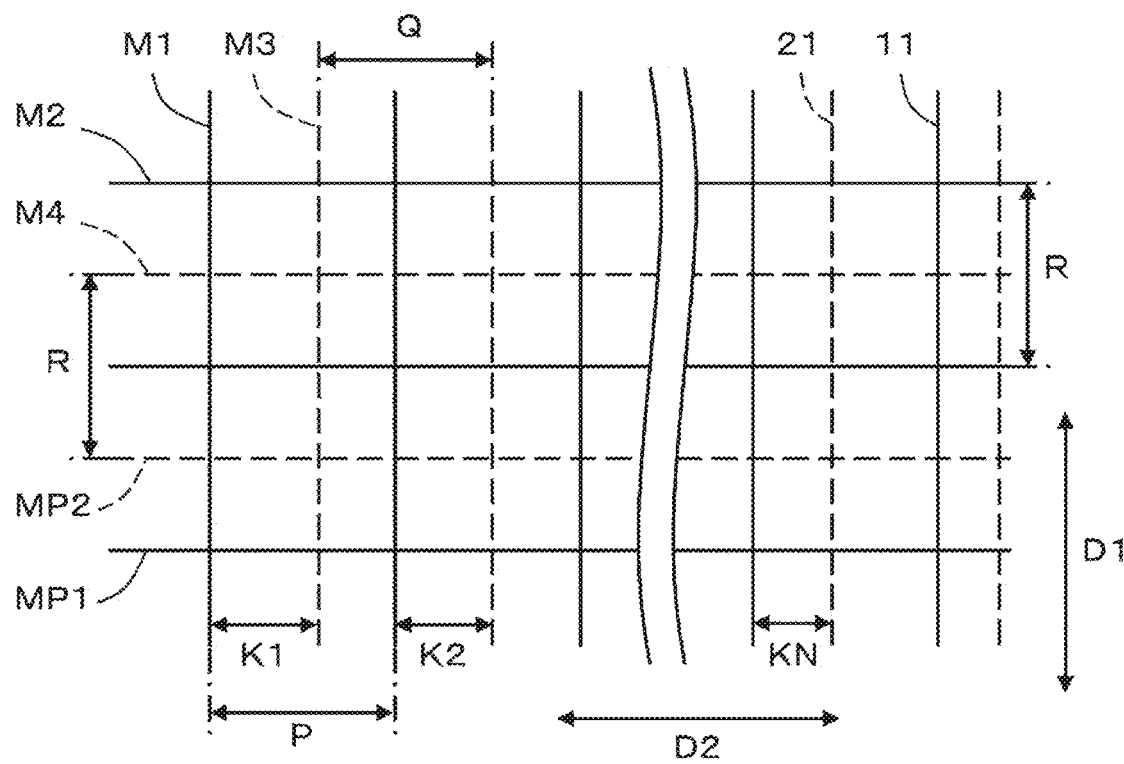
FIG. 4 is a view illustrating a state in which the second mesh-shaped electrode is deviated in a second direction with respect to the first mesh-shaped electrode.

Thus, as illustrated in FIG. 4, in the conductive member 3 for a touch panel according to Embodiment 1, for example, a case where the first mesh pattern MP1 is deviated to the left side along the second direction D2 with respect to the second mesh pattern MP2, and the second mesh pattern MP2 is deviated to the right side with respect to the first mesh pattern MP1 is considered. In this case, intervals K1, K2, . . . , and KN between the first thin metal wires M1 and the third thin metal wires M3 are wider than the respective intervals L1, L2, . . . , and LN in FIG. 3, but the pitch Q of the plurality of third thin metal wires M3 is narrower than the pitch P of the plurality of first thin metal wires M1, so that the intervals K1, K2, . . . , and KN become narrower as the position becomes closer to the right side along the second direction D2, and the value changes so as to monotonously decrease similarly to the intervals L1, L2, . . . , and LN.

Figure 5:
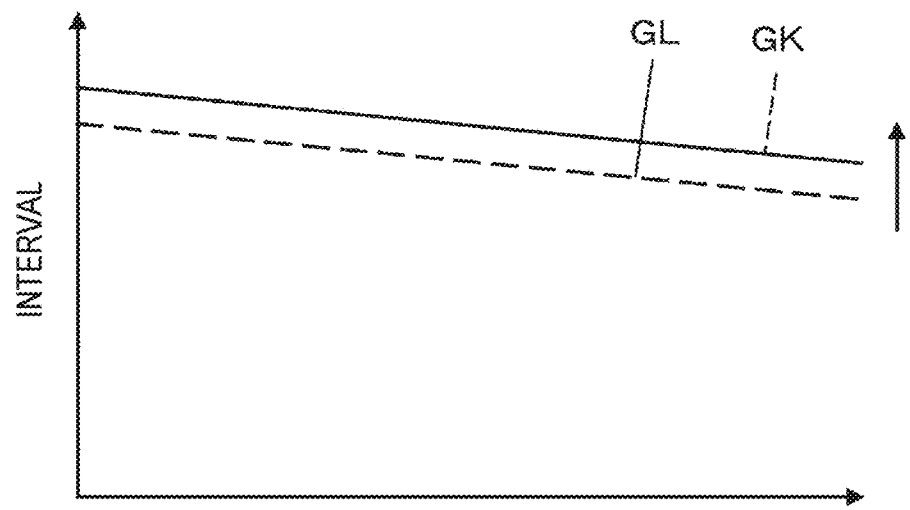
FIG. 5 is a graph presenting the transition of the interval between a first thin metal wire and a third thin metal wire.

FIG. 5 illustrates a graph GL presenting the relationship between the intervals L1, L2, ..., and LN in FIG. 3 and the arrangement numbers of the first thin metal wires M1, and a graph GK presenting the relationship between the intervals K1, K2, ..., and KN in FIG. 4 and the arrangement numbers of the first thin metal wires M1. The graph GK corresponds to a graph obtained by shifting the graph GL upward in parallel along the vertical axis presenting the interval by the distance of the positional deviation between the first mesh pattern MP1 and the second mesh pattern MP2. As can be seen from these graphs GL and GK, the intervals L1, L2, ..., and LN and the intervals K1, K2, ..., and KN have different values, but they still decrease monotonously as the arrangement number of the first thin metal wire M1 increases.

In this way, in the conductive member 3 for a touch panel according to Embodiment 1 of the present invention, even if the first mesh pattern MP1 of the first mesh-shaped electrode 11 and the second mesh pattern MP2 of the second mesh-shaped electrode 21 are deviated from each other along the second direction D2, the interval between the first thin metal wire M1 and the third thin metal wire M3 changes so as to monotonously decrease along the second direction D2, as in a case where no positional deviation occurs. Accordingly, even if the first mesh pattern MP1 of the first mesh-shaped electrode 11 and the second mesh pattern MP2 of the second mesh-shaped electrode 21 are deviated from each other along the second direction D2, moire and unevenness in image density when the conductive member 3 for a touch panel is disposed on the display module are less noticeable, as compared to the case where no positional deviation occurs.

Thus, with the conductive member 3 for a touch panel according to Embodiment 1 of the present invention, even in the case where a positional deviation occurs between the first mesh pattern MP1 of the first mesh-shaped electrode 11 in the first layer and the second mesh pattern MP2 of the second mesh-shaped electrode 21 in the second layer, it is possible to maintain the image quality visually recognized when the conductive member 3 for a touch panel is disposed on the display module and used.

Also, since the touch panel 1 including the conductive member 3 for a touch panel includes the conductive member 3 for a touch panel according to Embodiment 1 of the present invention, even in the case where a positional deviation occurs between the first mesh pattern MP1 and the second mesh pattern MP2 in the conductive member 3 for a touch panel, it is possible to maintain the image quality visually recognized upon disposition and use on the display module.

Figure 6:
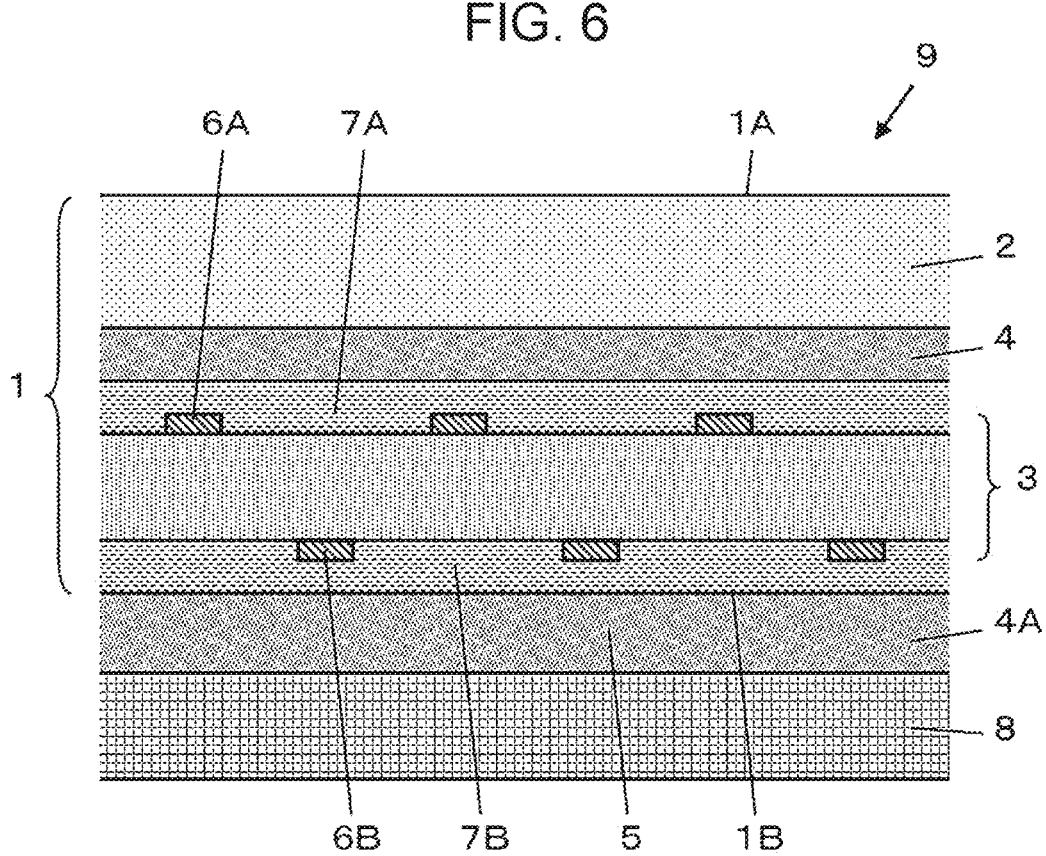
FIG. 6 is a partial cross-sectional view of a touch panel display device according to Embodiment 1.

Here, for example, as illustrated in FIG. 6, the touch panel 1 including the conductive member 3 for a touch panel according to Embodiment 1 is disposed on a display module 8 for displaying an image, thereby constituting a touch panel display device 9. In FIG. 6, the display module 8 is bonded to the back surface 1B of the touch panel 1 with a transparent adhesive 4A. Although not illustrated in detail, the display module 8 includes a display screen such as a liquid crystal display, a controller for controlling display and the like of an image on the display screen, and the like. An operator of the touch panel display device 9 visually recognizes an image displayed on the display module 8 through the touch panel 1, and performs a touch operation via the touch panel 1 based on the visually recognized image.

The touch panel display device 9 is equipped with the conductive member 3 for a touch panel according to Embodiment 1 of the present invention. Thus, even in the case where a positional deviation occurs between the first mesh pattern MP1 and the second mesh pattern MP2 in the conductive member 3 for a touch panel, it is possible to maintain the image quality visually recognized.

Note that the wire widths of the first thin metal wire M1, the second thin metal wire M2, the third thin metal wire M3, and the fourth thin metal wire M4 each preferably fall within a range of 1 μm to 5 μm so that the presence of the first thin metal wire M1, the second thin metal wire M2, the third thin metal wire M3, and the fourth thin metal wire M4 is less noticeable when an observer visually recognizes the conductive member 3 for a touch panel. Also, from the same viewpoint, the pitch P of the plurality of first thin metal wires M1, the pitch R of the plurality of second thin metal wires M2, the pitch Q of the plurality of third thin metal wires M3, and the pitch R of the plurality of fourth thin metal wires M4 preferably fall within a range of 100 μm to 1000 μm.

Also, in a case where the conductive member 3 for a touch panel is disposed on the display module 8, the opening ratio of the mesh pattern formed by overlapping the first mesh pattern MP1 of the first mesh-shaped electrode 11 and the second mesh pattern MP2 of the second mesh-shaped electrode 21 is preferably 95% to 99.5% so that the observer can clearly visually recognize an image displayed on the display module 8. Here, the opening ratio of the mesh pattern refers to a ratio of an area occupied by the opening portions of the mesh pattern in the intersection region where the first mesh pattern MP1 and the second mesh pattern MP2 overlap each other in plan view.

Also, the transparent substrate 5 is not particularly limited as long as it is transparent, has electrical insulating properties, and can support the first conductive layer 6A and the second conductive layer 6B. For example, the transparent substrate 5 may be composed of a resin substrate, a glass substrate, or the like, or may be composed of a flexible film.

Also, although it is described that the interval between the first thin metal wire M1 and the third thin metal wire M3 adjacent to each other changes so as to monotonously decrease toward the right side in the second direction D2, the interval may change so as to monotonously increase toward the same direction, or may change so that a monotonous decrease and a monotonous increase continue toward the same direction.

Here, the interval changing so that a monotonous decrease and a monotonous increase continue means that the interval between the thin metal wires changes so as to monotonously decrease once and then monotonously increase toward the same direction, or that the interval between the thin metal wires changes so as to monotonously increase once and then monotonously decrease. In this case, the interval between the thin metal wires has one relative maximum or one relative minimum.

Also, in the present invention, the interval changing so as to monotonously increase toward the same direction or the interval changing so as to monotonously decrease toward the same direction is referred to as the interval changing monotonously. Further, the interval changing monotonously toward the same direction, or the interval changing so that a monotonous increase and a monotonous decrease continue toward the same direction is referred to as the interval changing continuously. The respective intervals may change linearly as illustrated in FIG. 5, or may change in a curved manner such as an exponential change.

For example, in the case where the interval between the first thin metal wire M1 and the third thin metal wire M3 adjacent to each other changes so as to monotonously increase toward the right side along the second direction D2, even if the first mesh pattern MP1 and the second mesh pattern MP2 are deviated along the second direction D2, the interval between the first thin metal wire M1 and the third thin metal wire M3 adjacent to each other changes so as to monotonously increase toward the right side along the second direction D2, as in the case where no positional deviation occurs.

Also, for example, in the case where the interval between the first thin metal wire M1 and the third thin metal wire M3 adjacent to each other changes so that a monotonous increase and a monotonous decrease continue toward the right side along the second direction D2, even if the first mesh pattern MP1 and the second mesh pattern MP2 are deviated along the second direction D2, the interval between the first thin metal wire M1 and the third thin metal wire M3 adjacent to each other changes so that a monotonous increase and a monotonous decrease continue toward the right side along the second direction D2, as in the case where no positional deviation occurs.

Thus, not only in the case where the interval between the first thin metal wire M1 and the third thin metal wire M3 adjacent to each other changes so as to monotonously decrease toward the same direction, but also in the case where the interval changes so as to monotonously increase toward the same direction, and in the case where the interval changes so that a monotonous decrease and a monotonous increase continue toward the same direction, it is possible to maintain the image quality visually recognized when the conductive member 3 for a touch panel is disposed on the display module and used.

Also, as a method of producing the conductive member 3 for a touch panel so that the interval between the first thin metal wire M1 and the third thin metal wire M3 adjacent to each other continuously changes toward the same direction, the photolithography process is exemplified, but the method of producing the conductive member 3 for a touch panel is not particularly limited to this method. With the conductive member 3 for a touch panel according to Embodiment 1, regardless of the producing method, even if a positional deviation occurs between the first mesh pattern MP1 of the first mesh-shaped electrode 11 and the second mesh pattern MP2 of the second mesh-shaped electrode 21 for some reason, it is possible to maintain the image quality visually recognized via the conductive member 3 for a touch panel.

Also, as illustrated in FIG. 1, since the conductive member 3 for a touch panel has the plurality of first mesh-shaped electrodes 11 and the plurality of second mesh-shaped electrodes 21, in the transmissive region S1, a plurality of intersection regions where the first mesh-shaped electrodes 11 and the second mesh-shaped electrodes 21 overlap each other are arranged along the first direction D1 and the second direction D2.

In one intersection region where the first mesh-shaped electrode 11 and the second mesh-shaped electrode 21 overlap each other, although it is described that the interval between the first thin metal wire M1 and the third thin metal wire M3 continuously changes toward the same direction along the second direction D2, the conductive member 3 for a touch panel can be designed so that the interval between the first thin metal wire M1 and the third thin metal wire M3 adjacent to each other continuously changes toward the same direction along the second direction D2 over a plurality of intersection regions arranged along the second direction D2.

In this case, moire and unevenness in image density when the conductive member 3 for a touch panel is disposed on the display module 8 can be made further less noticeable.

Also, the interval between the first thin metal wire M1 and the third thin metal wire M3 adjacent to each other and the interval between the second thin metal wire M2 and the fourth thin metal wire M4 adjacent to each other can be measured by using an optical microscope.

For example, in the transmissive region S1 of the conductive member 3 for a touch panel, in a case where the conductive member 3 for a touch panel is designed so that the interval between the first thin metal wire M1 and the third thin metal wire M3 adjacent to each other continuously changes toward the same direction along the second direction D2 over a plurality of intersection regions arranged along the second direction D2, and the transmissive region S1 has a width of 300 mm along the second direction D2, the observer can check whether the interval between the first thin metal wire M1 and the third thin metal wire M3 adjacent to each other continuously changes along the second direction D2 by measuring the interval between the first thin metal wire M1 and the third thin metal wire M3 adjacent to each other every 30 mm obtained by dividing the width of the transmissive region S1 into 10, and by observing a change along the second direction D2 for the 10 measured intervals. Also, for example, in a case where the pitch P of the first thin metal wires M1 is 300 μm, and the width of the transmissive region S1 in the second direction D2 is 300 mm, it is possible to check whether the interval between the first thin metal wire M1 and the third thin metal wire M3 continuously changes along the second direction D2 by measuring the interval every 100 pitches.

In this way, in order for the observer to accurately determine whether the interval continuously changes, it is preferable to measure the interval at least 10 points.

Also, as the number of measurements of the interval increases, the observer can accurately determine whether the interval continuously changes. However, for example, when the measurement is performed at 20 points, the observer can sufficiently accurately determine whether the interval continuously changes. Thus, from such a viewpoint, the measurement is preferably performed at 10 points or more and 20 points or less.

In the conductive member 3 for a touch panel according to Embodiment 1 of the present invention, for example, by measuring the interval between the first thin metal wire M1 and the third thin metal wire M3 in this way, it is checked that the interval continuously changes toward the same direction along the second direction D2.

Also, the difference between the maximum value and the minimum value of the interval between the first thin metal wire M1 and the third thin metal wire M3, the interval which continuously changes in the second direction D2, is preferably 1/30 or more and 1/2 or less of the mean value of the interval. When the difference between the maximum value and the minimum value falls within such a range, even if the first mesh pattern MP1 and the second mesh pattern MP2 are deviated from each other, moire and unevenness in image density when the conductive member 3 for a touch panel is disposed on the display module 8 are less noticeable, and it is possible to maintain the image quality visually recognized via the conductive member 3 for a touch panel.

Also, although it is described that the interval between the first thin metal wire M1 and the third thin metal wire M3 adjacent to each other continuously changes along the second direction D2, the interval between the second thin metal wire M2 and the fourth thin metal wire M4 adjacent to each other may continuously change along the first direction D1.

Further, the interval between the first thin metal wire M1 and the third thin metal wire M3 adjacent to each other may continuously change along the second direction D2, and the interval between the second thin metal wire M2 and the fourth thin metal wire M4 adjacent to each other may continuously change along the first direction D1.

Accordingly, even if the first mesh pattern MP1 and the second mesh pattern MP2 are deviated from each other, moire and unevenness in image density when the conductive member 3 for a touch panel is disposed on the display module 8 are less noticeable, and it is possible to maintain the image quality visually recognized via the conductive member 3 for a touch panel.

In a case where the observer determines whether the interval between the second thin metal wire M2 and the fourth thin metal wire M4 adjacent to each other continuously changes along the first direction D1, the interval is preferably measured at 10 points or more and 20 points or less as in the case of determining whether the interval between the first thin metal wire M1 and the third thin metal wire M3 adjacent to each other continuously changes.

Also, similarly to the interval between the first thin metal wire M1 and the third thin metal wire M3, the difference between the maximum value and the minimum value of the interval between the second thin metal wire M2 and the fourth thin metal wire M4 that continuously changes in the first direction D1 is preferably $1/30$ or more and $1/2$ or less of the mean value of the interval, from the viewpoint of maintaining the image quality visually recognized via the conductive member 3 for a touch panel in the case where the first mesh pattern MP1 and the second mesh pattern MP2 are deviated from each other.

Also, it is described that the first direction D1 and the second direction D2 are orthogonal to each other, but are not limited to being orthogonal to each other.

Figure 7:
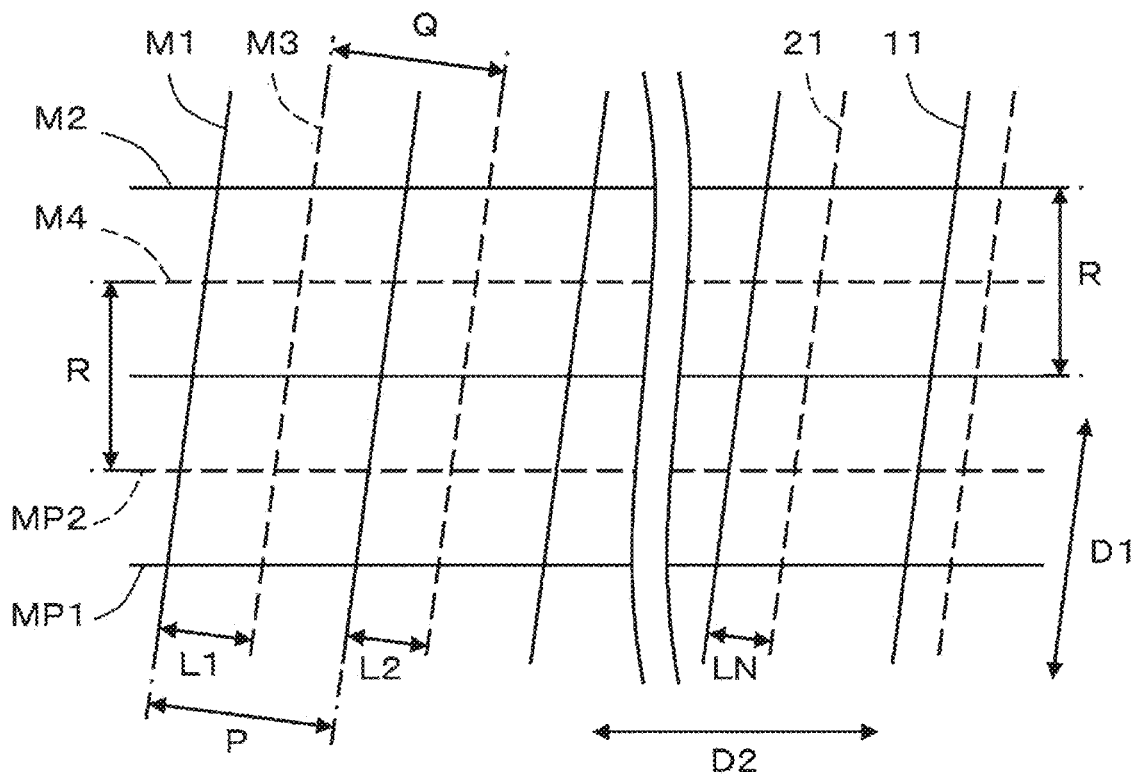
FIG. 7 is a partially enlarged plan view of a conductive member for a touch panel in an intersection region where a first mesh-shaped electrode and a second mesh-shaped electrode overlap each other according to a modification of Embodiment 1.

For example, as illustrated in FIG. 7, the first direction D1 may be inclined with respect to the direction orthogonal to the second direction D2. In this case, in plan view, the first thin metal wire M1, the second thin metal wire M2, the third thin metal wire M3, and the fourth thin metal wire M4 form a mesh pattern having parallelogram opening portions.

As described above, even in the case where the first direction D1 and the second direction D2 are not orthogonal to each other, moire and unevenness in image density caused by a positional deviation between the first mesh pattern MP1 and the second mesh pattern MP2 when the conductive member 3 for a touch panel is disposed on the display module 8 are less noticeable, and it is possible to maintain the image quality visually recognized via the conductive member 3 for a touch panel.

However, from the viewpoint of suppressing moire and unevenness in density, the intersecting angle between the first direction D1 and the second direction D2 is preferably 50° or more and 90° or less, and more preferably 60° or more and 80° or less. Further, from the viewpoint of suppressing moire, the first direction D1 and the second direction D2 are preferably inclined with respect to the direction of the pixel arrangement of the display module 8.

Also, it is illustrated that the first thin metal wire M1 has a linear shape between intersections with two of the second thin metal wires M2 adjacent to each other, the second thin metal wire M2 has a linear shape between intersections with two of the first thin metal wires M1 adjacent to each other, the third thin metal wire M3 has a linear shape between intersections with two of the fourth thin metal wires M4 adjacent to each other, and the fourth thin metal wire M4 has a linear shape between intersections with two of the third thin metal wires M3 adjacent to each other. However, the first thin metal wire M1, the second thin metal wire M2, the third thin metal wire M3, and the fourth thin metal wire M4 may have curved shapes.

Figure 8:
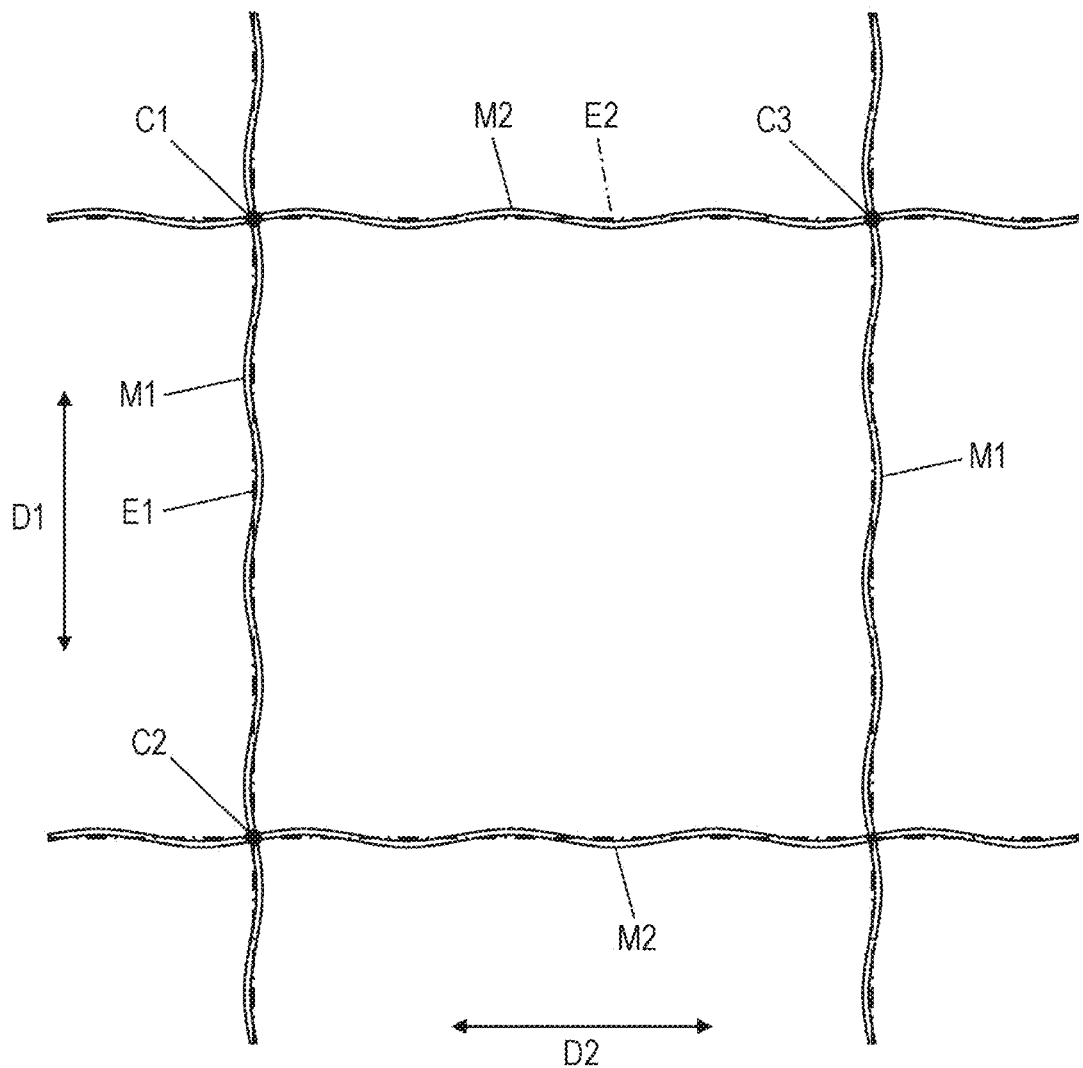
FIG. 8 is a view illustrating an example of a first thin metal wire and a second thin metal wire according to another modification of Embodiment 1.

For example, as illustrated in FIG. 8, the first thin metal wire M1 may have a curved shape between intersections C1 and C2 with two of the second thin metal wires M2 adjacent to each other, and the second thin metal wire M2 may have a curved shape between intersections C1 and C3 with two of the first thin metal wires M1 adjacent to each other. In this case, the first direction D1 may be defined as a direction in which a straight line E1 connecting the intersection C1 and the intersection C2 extends, and the second direction D2 may be defined as a direction in which a straight line E2 connecting the intersection C1 and the intersection C3 extends. The first thin metal wire M1 extends substantially along the first direction D1, and the second thin metal wire M2 extends substantially along the second direction D2.

Figure 9:
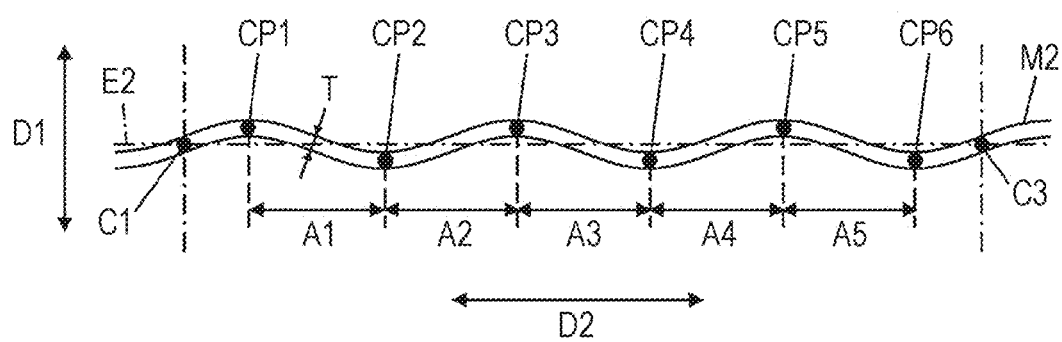
FIG. 9 is an enlarged view of the second thin metal wire according to the modification illustrated in FIG. 8.

As illustrated in FIG. 9, the second thin metal wire M2 has a wire width T, and has curved points CP1 to CP6 alternately positioned on both sides in the first direction D1 of the straight line E2 along the second direction D2. The curved points CP1 to CP6 are points on the second thin metal wire M2 at which perpendicular lines drawn from the outer edge of the second thin metal wire M2 to the straight line E2 passing through the intersections C1 and C3 on the second thin metal wire M2 become maximum, and the second thin metal wire M2 has an upwardly protruding shape or a downwardly protruding shape with respect to the straight line E2 at the curved points CP1 to CP6. In the example in FIG. 9, between the intersection C1 and the intersection C3, the second thin metal wire M2 has three curved points CP1, CP3, and CP5 on the upper side of the straight line E2, and three curved points CP2, CP4, and CP6 on the lower side of the straight line E2.

Here, in FIG. 9, the curved shape and the wire width T of the second thin metal wire M2 are illustrated in an exaggerated manner for easy understanding.

In order to suppress moire and unevenness in image density in the case where the conductive member 3 for a touch panel is disposed on the display module 8, the second thin metal wire M2 preferably has 3 to 20 curved points between the intersection C1 and the intersection C3. Also, from the same viewpoint, distances A1 to A5 between the curved points CP1 to CP6 adjacent to each other in the second direction D2 are preferably randomly set. Further, from the same viewpoint, the lengths of the perpendicular lines drawn from the outer edge of the second thin metal wire M2 to the straight line E2 passing through the intersections C1 and C3 on the second thin metal wire M2 are preferably randomly set within a range of $1/10$ times to 2 times the wire width T of the second thin metal wire M2.

Similarly to the second thin metal wire M2, the first thin metal wire M1 preferably has 3 to 20 curved points between the intersection C1 and the intersection C2. Also, the distances between the curved points of the first thin metal wire M1 adjacent to each other in the first direction D1 are preferably randomly set. Further, the lengths of the perpendicular lines drawn from the outer edge of the first thin metal wire M1 to the straight line E1 passing through the intersections C1 and C2 on the first thin metal wire M1 are preferably randomly set within a range of $1/10$ times to 2 times the wire width of the first thin metal wire M1.

Although not illustrated, the third thin metal wire M3 and the fourth thin metal wire M4 may also have curved shapes, similarly to the first thin metal wire M1 and the second thin metal wire M2.

In this way, even in the case where the first thin metal wire M1, the second thin metal wire M2, the third thin metal wire M3, and the fourth thin metal wire M4 have curved shapes, as in the case where they have linear shapes, moire and unevenness in image density caused by a positional deviation between the first mesh pattern MP1 and the second mesh pattern MP2 when the conductive member 3 for a touch panel is disposed on the display module 8 are less noticeable, and it is possible to maintain the image quality visually recognized via the conductive member 3 for a touch panel.

Also, although it is described that the first mesh-shaped electrode 11 is formed on the one surface 5A of the transparent substrate 5 and the second mesh-shaped electrode 21 is formed on the other surface 5B, the first mesh-shaped electrode 11 and the second mesh-shaped electrode 21 do not have to be formed on both surfaces of the transparent substrate 5 as long as the first mesh-shaped electrode 11 is formed on one surface side of a transparent insulating member and the second mesh-shaped electrode 21 is formed on the other surface side thereof.

Figure 10:
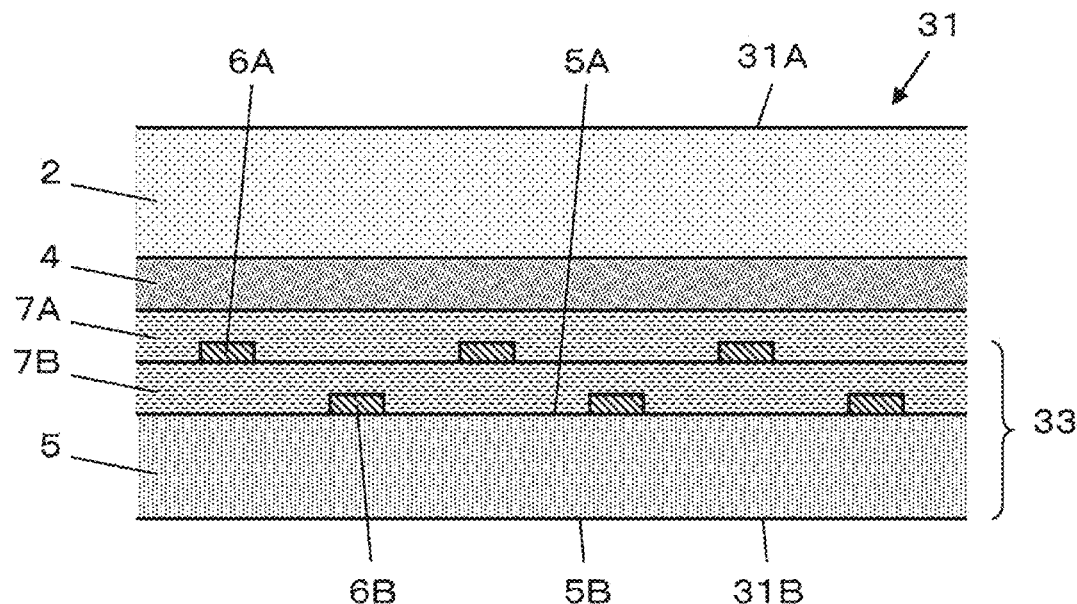
FIG. 10 is a partial cross-sectional view of a touch panel according to still another modification of Embodiment 1.

For example, as illustrated in FIG. 10, the second conductive layer 6B having the second mesh-shaped electrode 21 may be formed on the transparent substrate 5, the insulating layer 7B may be formed thereon, and the first conductive layer 6A having the first mesh-shaped electrode 11 may be formed on the insulating layer 7B. At this time, for the purpose of protecting the first conductive layer 6A, the insulating layer 7A may be further formed on the first conductive layer 6A and the insulating layer 7B.

In the example illustrated in FIG. 10, a conductive member 33 for a touch panel is composed of the transparent substrate 5, the second conductive layer 6B, the insulating layer 7B, and the first conductive layer 6A. Also, the insulating layer 7A is formed on the first conductive layer 6A and the insulating layer 7B, and the insulating layer 7A and the cover panel 2 are bonded to each other with the transparent adhesive 4, thereby constituting a touch panel 31. A front surface 31A of the touch panel 31 is formed by a surface of the cover panel 2 on a side opposite to the adhesive 4, and a back surface 31B of the touch panel 31 is formed by a surface 5B of the transparent substrate 5 on a side opposite to the second conductive layer 6B. The front surface 31A of the touch panel 31 is a surface visually recognized by the observer, and the back surface 31B is a surface on a side on which the display module 8 is disposed.

In this way, even in the case where the first conductive layer 6A and the second conductive layer 6B are formed on a one surface 5A side of the transparent substrate 5, similarly to the conductive member 3 for a touch panel, even if the first mesh pattern MP1 and the second mesh pattern MP2 are deviated from each other, moire and unevenness in image density when the conductive member 33 for a touch panel is disposed on the display module 8 are less noticeable, and it is possible to maintain the image quality visually recognized via the conductive member 33 for a touch panel.

Embodiment 2

In the conductive member 3 for a touch panel according to Embodiment 1 illustrated in FIG. 3, the plurality of first thin metal wires M1 are arranged at the constant pitch P and the plurality of third thin metal wires M3 are arranged at the constant pitch Q different from the pitch P, so that, in plan view, the intervals L1, L2, ..., and LN between the first thin metal wires M1 and the third thin metal wires M3 continuously change along the second direction D2. However, the plurality of first thin metal wires M1 do not have to be arranged at the constant pitch P, and the plurality of third thin metal wires M3 do not have to be arranged at the constant pitch Q.

Figure 11:
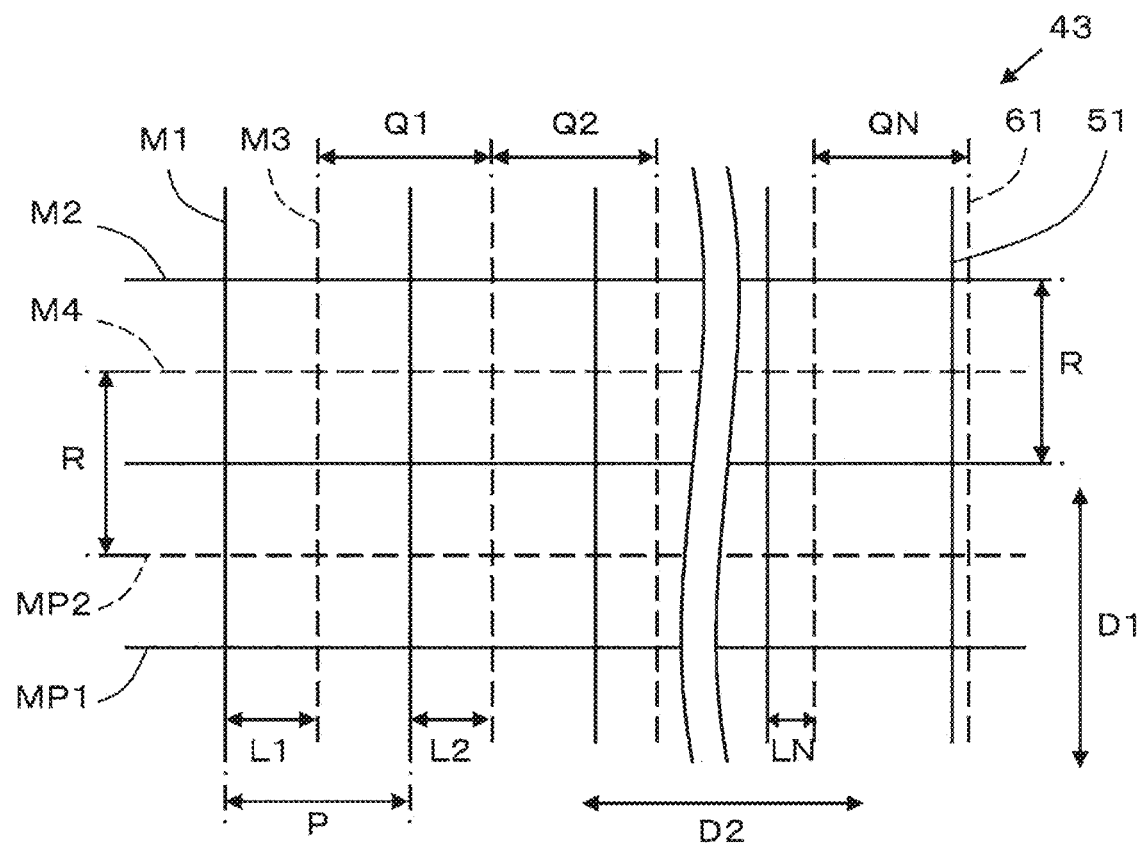
FIG. 11 is a partially enlarged plan view of a conductive member for a touch panel in an intersection region where a first mesh-shaped electrode and a second mesh-shaped electrode overlap each other according to Embodiment 2.

FIG. 11 is a partially enlarged plan view of a conductive member 43 for a touch panel according to Embodiment 2 in an intersection region where a first mesh-shaped electrode 51 and a second mesh-shaped electrode 61 overlap each other.

The conductive member 43 for a touch panel includes the first mesh-shaped electrode 51 that is the same as the first mesh-shaped electrode 11 in the conductive member 3 for a touch panel according to Embodiment 1 illustrated in FIG. 3, and includes the second mesh-shaped electrode 61 instead of the second mesh-shaped electrode 21.

The second mesh-shaped electrode 61 has a plurality of third thin metal wires M3 extending along the first direction D1 and arranged in the second direction D2, and a plurality of fourth thin metal wires M4 extending along the second direction D2 and arranged in the first direction D1.

In the example illustrated in FIG. 11, arrangement intervals Q1, Q2, ..., and QN of the plurality of third thin metal wires M3 become narrower toward the right along the second direction D2, and the values thereof change so as to monotonously decrease. Thus, the intervals L1, L2, ..., and LN between the first thin metal wires M1 and the third thin metal wires M3 become narrower toward the right along the second direction D2, and the values thereof change so as to monotonously decrease. Thus, the intervals L1, L2, ..., and LN between the first thin metal wires M1 and the third thin metal wires M3 adjacent to each other also change so as to monotonously decrease toward the right side in the second direction D2.

Accordingly, even if the first mesh pattern MP1 and the second mesh pattern MP2 are deviated from each other, the intervals L1, L2, ..., and LN between the first thin metal wires M1 and the third thin metal wires M3 adjacent to each other change so as to monotonously decrease toward the right side in the second direction D2, as in the case where the first mesh pattern MP1 and the second mesh pattern MP2 are not deviated from each other. Thus, with the conductive member 43 for a touch panel according to Embodiment 2, similarly to the conductive member 3 for a touch panel according to Embodiment 1, even if the first mesh pattern MP1 and the second mesh pattern MP2 are deviated from each other, it is possible to maintain the image quality visually recognized via the conductive member 43 for a touch panel.

In the example of FIG. 11, the plurality of first thin metal wires M1 are arranged at a constant pitch P, and the plurality of third thin metal wires M3 are arranged at an arrangement interval that continuously changes along the second direction D2, but the plurality of first thin metal wires M1 may be arranged at an arrangement interval that continuously changes along the second direction D2, and the plurality of third thin metal wires M3 may be arranged at a constant pitch Q.

Also, both the plurality of first thin metal wires M1 and the plurality of third thin metal wires M3 may be arranged at arrangement intervals that continuously change along the second direction D2.

Even in such a case, since the interval between the first thin metal wire M1 and the third thin metal wire M3 adjacent to each other continuously changes toward the same direction along the second direction D2, even if the first mesh pattern MP1 and the second mesh pattern MP2 are deviated from each other along the second direction D2, it is possible to maintain the image quality visually recognized via the conductive member 43 for a touch panel.

Also, although the plurality of second thin metal wires M2 and the plurality of fourth thin metal wires M4 are arranged along the first direction D1 at a constant pitch R, at least one of the plurality of second thin metal wires M2 or the plurality of fourth thin metal wires M4 may be arranged at an arrangement interval that continuously changes along the first direction D1.

In such a case, since the interval between the second thin metal wire M2 and the fourth thin metal wire M4 adjacent to each other continuously changes along the first direction D1, even if the first mesh pattern MP1 and the second mesh pattern MP2 are deviated from each other along the first direction D1, it is possible to maintain the image quality visually recognized via the conductive member 43 for a touch panel.

The first thin metal wire M1, the second thin metal wire M2, the third thin metal wire M3, and the fourth thin metal wire M4 according to Embodiment 2 can be patterned by the photolithography process or the like, similarly to the first thin metal wire M1, the second thin metal wire M2, the third thin metal wire M3, and the fourth thin metal wire M4 according to Embodiment 1.

Hereinafter, respective members constituting the conductive member 3 for a touch panel according to Embodiment 1 will be described. Respective members constituting the conductive member 43 for a touch panel according to Embodiment 2 are similar to the respective members constituting the conductive member 3 for a touch panel according to Embodiment 1.

Transparent Substrate

The transparent substrate 5 is not particularly limited as long as it is transparent, has electrical insulating properties, and is capable of supporting the first conductive layer 6A and the second conductive layer 6B. However, the transparent substrate 5 uses, for example, a resin substrate, a glass substrate, or the like. More specifically, as the material constituting the transparent substrate 5, for example, glass, tempered glass, alkali-free glass, polyethylene terephthalate (PET), polyethylene naphthalate (PEN), cyclo-olefine polymer (COP), cyclic olefin copolymer (COC), polycarbonate (PC), acrylic resin, polyethylene (PE), polypropylene (PP), polystyrene (PS), polyvinyl chloride (PVC), polyvinylidene chloride (PVDC), cellulose triacetate (TAC), or the like, can be used. The thickness of the transparent substrate 5 is, for example, preferably 20 μm to 1100 μm, and more preferably 20 μm to 500 μm. In particular, in the case of an organic resin substrate such as PET, the thickness is preferably 20 μm to 200 μm, and more preferably 30 μm to 100 μm.

The transparent substrate 5 is preferably a flexible film, for example, because the transparent substrate 5 can be applied to curved surface devices, bending devices, and winding devices, which have been highly demanded in recent years, and because a peripheral region including peripheral wires can be bent in order to reduce the thickness of the touch panel display device and narrow the frame. In the case where a flexible film is used as the transparent substrate 5, alignment becomes difficult due to so-called web handling instability (edge detection, bending, and the like), and a positional deviation between the first mesh pattern MP1 and the second mesh pattern MP2 is likely to occur. Thus, the advantageous effect of the present invention is more likely to be obtained.

The total luminous transmittance of the transparent substrate 5 is preferably 40% to 100%. The total luminous transmittance is measured by using, for example, "Plastics-Determination of total luminous transmittance and reflectance" prescribed in JIS K 7375:2008.

One preferred embodiment of the transparent substrate 5 is a treated substrate that has been subjected to at least one treatment selected from the group consisting of atmospheric pressure plasma treatment, corona discharge treatment, and ultraviolet irradiation treatment. By performing the above-described treatment, a hydrophilic group such as an OH group is introduced into the surfaces of the treated transparent substrate 5, and adhesiveness between the transparent substrate 5 and the first conductive layer 6A and adhesiveness between the transparent substrate 5 and the second conductive layer 6B are improved. Also, among the above-described treatment, the atmospheric pressure plasma treatment is preferable in that the adhesiveness between the transparent substrate 5 and the first conductive layer 6A and the adhesiveness between the transparent substrate 5 and the second conductive layer 6B are further improved.

Undercoat Layer

In order to improve the adhesiveness between the transparent substrate 5 and the first conductive layer 6A and between the transparent substrate 5 and the second conductive layer 6B, an undercoat layer may be disposed between the transparent substrate 5 and the first conductive layer 6A and between the transparent substrate 5 and the second conductive layer 6B. The undercoat layer includes a polymer, and the adhesiveness between the transparent substrate 5 and the first conductive layer 6A and the adhesiveness between the transparent substrate 5 and the second conductive layer 6B are further improved.

The method of forming the undercoat layer is not particularly limited, and examples thereof include a method in which a composition for forming the undercoat layer including a polymer is applied onto a substrate, and heat processing is performed as necessary. Also, as the composition for forming the undercoat layer including the polymer, gelatin, acrylic resin, urethane resin, acrylic latex or styrene latex including inorganic or polymer fine particles, or the like, may be used.

If necessary, the conductive member 3 for a touch panel may include, for example, a refractive index adjustment layer as another layer in addition to the above-described undercoat layer, between the transparent substrate 5 and the first conductive layer 6A and between the transparent substrate 5 and the second conductive layer 6B. As the refractive index adjustment layer, for example, an organic layer to which particles of a metal oxide such as zirconium oxide for adjusting the refractive index are added can be used.

Thin Metal Wire

The thicknesses of the first thin metal wire M1, the second thin metal wire M2, the third thin metal wire M3, and the fourth thin metal wire M4 according to Embodiment 1 are not particularly limited, but are preferably 0.01 μm to 10.00 μm, more preferably 2.00 μm or less, and particularly preferably 0.02 μm to 2.00 μm.

The first thin metal wire M1, the second thin metal wire M2, the third thin metal wire M3, and the fourth thin metal wire M4 are formed of a metal or an alloy, and can be formed of, for example, silver, copper, gold, aluminum, nickel, chromium, molybdenum, or tungsten. The first thin metal wire M1, the second thin metal wire M2, the third thin metal wire M3, and the fourth thin metal wire M4 preferably include copper, but may include a metal other than copper, such as gold or silver. Also, the first thin metal wire M1, the second thin metal wire M2, the third thin metal wire M3, and the fourth thin metal wire M4 may contain metal silver and gelatin or a polymer binder, such as acrylic latex or styrene latex, which is suitable for forming a mesh pattern. Other preferred examples are metals, such as aluminum, silver, molybdenum, and titanium, and an alloy thereof. Further, a laminated structure of the above-described materials may be used. For example, a thin metal wire having a laminated structure of molybdenum/copper/molybdenum, molybdenum/aluminum/molybdenum, or the like, can be used.

Further, the first thin metal wire M1, the second thin metal wire M2, the third thin metal wire M3, and the fourth thin metal wire M4 may include, for example, metal-oxide particles; a metal paste such as a silver paste or a copper paste; or metal nanowire particles such as silver nanowires or copper nanowires.

In order to improve the visibility of the first thin metal wire M1, the second thin metal wire M2, the third thin metal wire M3, and the fourth thin metal wire M4, a blackened layer may be formed on at least the viewing side of the first thin metal wire M1, the second thin metal wire M2, the third thin metal wire M3, and the fourth thin metal wire M4. As the blackened layer, a metal oxide, a metal nitride, a metal oxynitride, a metal sulfide, or the like, is used, and typically, copper oxynitride, copper nitride, copper oxide, molybdenum oxide, or the like, can be used.

Next, a method of forming the first thin metal wire M1, the second thin metal wire M2, the third thin metal wire M3, and the fourth thin metal wire M4 will be described. As a method of forming these thin metal wires, for example, a sputtering process, a plating process, a silver halide process, a printing process, or the like, can be appropriately used.

A method of forming the first thin metal wire M1, the second thin metal wire M2, the third thin metal wire M3, and the fourth thin metal wire M4 by the sputtering process will be described. The first thin metal wire M1, the second thin metal wire M2, the third thin metal wire M3, and the fourth thin metal wire M4 can be formed by first forming a copper foil layer by sputtering, and forming copper wires from the copper foil layer by the photolithography process. The copper foil layer may be formed by so-called vapor deposition instead of sputtering. As the copper foil layer, an electrolytic copper foil can be used other than a sputtered copper foil or a vapor-deposited copper foil. More specifically, a process of forming copper wires described in JP2014-29614A can be used.

A method of forming the first thin metal wire M1, the second thin metal wire M2, the third thin metal wire M3, and the fourth thin metal wire M4 by the plating process will be described. For example, the first thin metal wire M1, the second thin metal wire M2, the third thin metal wire M3, and the fourth thin metal wire M4 can be constituted using a metal plating film that is formed on an underlayer by performing electroless plating on an electroless plating underlayer. In this case, the first thin metal wire M1, the second thin metal wire M2, the third thin metal wire M3, and the fourth thin metal wire M4 are formed by forming a catalytic ink containing at least metal fine particles in a pattern on a substrate, and then immersing the substrate in an electroless plating bath to form a metal plating film. More specifically, a method of producing a metal coated substrate described in JP2014-159620A can be used.

Alternatively, the first thin metal wire M1, the second thin metal wire M2, the third thin metal wire M3, and the fourth thin metal wire M4 are formed by forming a resin composition having at least a functional group capable of interacting with a metal catalytic precursor in a pattern on a substrate, then applying a catalyst or a catalytic precursor, and immersing the substrate in an electroless plating bath to form a metal plating film. More specifically, a method of producing a metal coated substrate described in JP2012-144761A can be applied.

A method of forming the first thin metal wire M1, the second thin metal wire M2, the third thin metal wire M3, and the fourth thin metal wire M4 by the silver halide process will be described. The first thin metal wire M1, the second thin metal wire M2, the third thin metal wire M3, and the fourth thin metal wire M4 can be formed by first performing exposure processing of exposing a silver halide emulsion layer including silver halide to light using an exposure pattern for forming the first thin metal wire M1, the second thin metal wire M2, the third thin metal wire M3, and the fourth thin metal wire M4, and then performing development processing on the exposed silver halide emulsion layer. As the development processing method, three methods of development processing according to a so-called silver halide diffusion transfer process, development processing of fixing directly after development, and development processing according to a so-called hardening development process can be used. More specifically, methods of producing thin metal wires described in JP2012-6377A, JP2014-112512A, JP2014-209332A, JP2015-22397A, JP2016-192200A, and WO2016/157585A can be used.

A method of forming the first thin metal wire M1, the second thin metal wire M2, the third thin metal wire M3, and the fourth thin metal wire M4 by the printing process will be described. The first thin metal wire M1, the second thin metal wire M2, the third thin metal wire M3, and the fourth thin metal wire M4 can be formed by first applying a conductive paste containing a conductive powder to a substrate so as to have the same patterns as the first thin metal wire M1, the second thin metal wire M2, the third thin metal wire M3, and the fourth thin metal wire M4, and then performing heat processing. The pattern formation using the conductive paste is performed by, for example, an inkjet process or a screen printing process. More specifically, a conductive paste described in JP2011-28985A can be used as the conductive paste.

Cover Panel

As the material of the cover panel 2, tempered glass, polycarbonate, polyethylene terephthalate, polymethyl methacrylate (PMMA), or the like, can be used, and the thickness of the cover panel 2 is preferably 0.1 mm to 1.5 mm.

Adhesive

As the adhesive 4 for bonding the cover panel 2 and the conductive member 3 for a touch panel to each other, an optical clear adhesive (OCA) sheet or optical clear resin (OCR) can be used, and a preferable film thickness is 10 μm or more and 200 μm or less. As the optical clear adhesive sheet, for example, 8146 series manufactured by 3M Company can be used.

REFERENCE SIGNS LIST 1, 31 touch panel
1A, 31A front surface
1B, 31B back surface
2 cover panel
3, 43 conductive member for touch panel
4, 4A adhesive
5 transparent substrate
5A, 5B surface
6A first conductive layer
6B second conductive layer
7A, 7B insulating layer 8 display module
9 touch panel display device
11, 51 first mesh-shaped electrode
12 first pad
13 first peripheral wire
14 first external connection terminal
21, 61 second mesh-shaped electrode
22 second pad
23 second peripheral wire
24 second external connection terminal
A1 to A5 distance
C1, C2, C3 intersection
CP1 to CP6 curved point
D1 first direction
D2 second direction
E1, E2 straight line
GK, GL graph
K1, K2, KN, L1, L2, LN interval
M1 first thin metal wire
M2 second thin metal wire
M3 third thin metal wire
M4 fourth thin metal wire
MP1 first mesh pattern
MP2 second mesh pattern
P, Q, R pitch
Q1, Q2, QN arrangement interval
S1 transmissive region
S2 peripheral region
T wire width

What is claimed is:

1. A conductive member for a touch panel, comprising:
a transparent insulating member; and
a first mesh-shaped electrode and a second mesh-shaped electrode disposed so as to face each other with the transparent insulating member interposed therebetween,
wherein the first mesh-shaped electrode consists of a plurality of first thin metal wires extending along a predetermined first direction and arranged in a direction orthogonal to the first direction, and a plurality of second thin metal wires extending along a second direction different from the first direction, arranged in a direction orthogonal to the second direction, and intersecting the plurality of first thin metal wires,
wherein the second mesh-shaped electrode consists of a plurality of third thin metal wires extending along the first direction and arranged in the direction orthogonal to the first direction, and a plurality of fourth thin metal wires extending along the second direction, arranged in a direction orthogonal to the second direction, and intersecting the plurality of third thin metal wires,
wherein, in plan view, the first thin metal wires and the third thin metal wires are alternately disposed in the direction orthogonal to the first direction, and the second thin metal wires and the fourth thin metal wires are alternately disposed in the direction orthogonal to the second direction, and
wherein an interval between the first thin metal wire and the third thin metal wire adjacent to each other along the direction orthogonal to the first direction continuously changes along the direction orthogonal to the first direction, or
wherein an interval between the second thin metal wire and the fourth thin metal wire adjacent to each other along the direction orthogonal to the second direction continuously changes along the direction orthogonal to the second direction, or
wherein the interval between the first thin metal wire and the third thin metal wire adjacent to each other along the direction orthogonal to the first direction continuously changes along the direction orthogonal to the first direction, and the interval between the second thin metal wire and the fourth thin metal wire adjacent to each other along the direction orthogonal to the second direction continuously changes along the direction orthogonal to the second direction.

2. The conductive member for a touch panel according to claim 1, wherein the interval between the first thin metal wire and the third thin metal wire adjacent to each other along the direction orthogonal to the first direction changes monotonously along the direction orthogonal to the first direction.

3. The conductive member for a touch panel according to claim 2, wherein the interval between the second thin metal wire and the fourth thin metal wire adjacent to each other along the direction orthogonal to the second direction changes monotonously along the direction orthogonal to the second direction.

4. The conductive member for a touch panel according to claim 1, wherein the interval between the first thin metal wire and the third thin metal wire adjacent to each other along the direction orthogonal to the first direction changes so that a monotonous increase and a monotonous decrease continue along the direction orthogonal to the first direction.

5. The conductive member for a touch panel according to claim 1, wherein the interval between the second thin metal wire and the fourth thin metal wire adjacent to each other along the direction orthogonal to the second direction changes monotonously along the direction orthogonal to the second direction.

6. The conductive member for a touch panel according to claim 1, wherein the interval between the second thin metal wire and the fourth thin metal wire adjacent to each other along the direction orthogonal to the second direction changes so that a monotonous increase and a monotonous decrease continue along the direction orthogonal to the second direction.

7. The conductive member for a touch panel according to claim 1, wherein a difference between a maximum value and a minimum value of the interval between the first thin metal wire and the third thin metal wire, the interval which continuously changes in the direction orthogonal to the first direction, is $1/30$ or more and $1/2$ or less of a mean value of the interval.

8. The conductive member for a touch panel according to claim 1, wherein a difference between a maximum value and a minimum value of the interval between the second thin metal wire and the fourth thin metal wire, the interval which continuously changes in the direction orthogonal to the second direction, is $1/30$ or more and $1/2$ or less of a mean value of the interval.

9. The conductive member for a touch panel according to claim 1,
wherein the plurality of first thin metal wires are arranged at a predetermined first pitch in the direction orthogonal to the first direction, and
wherein the plurality of third thin metal wires are arranged at a third pitch different from the first pitch in the direction orthogonal to the first direction.

10. The conductive member for a touch panel according to claim 1, wherein at least one of an arrangement interval between the first thin metal wires adjacent to each other along the direction orthogonal to the first direction or an arrangement interval between the third thin metal wires adjacent to each other along the direction orthogonal to the first direction continuously changes along the direction orthogonal to the first direction.

11. The conductive member for a touch panel according to claim 1,
wherein the plurality of second thin metal wires are arranged at a predetermined second pitch in the direction orthogonal to the second direction, and
wherein the plurality of fourth thin metal wires are arranged at a fourth pitch different from the second pitch in the direction orthogonal to the second direction.

12. The conductive member for a touch panel according to claim 1, wherein at least one of an arrangement interval between the second thin metal wires adjacent to each other along the direction orthogonal to the second direction or an arrangement interval between the fourth thin metal wires adjacent to each other along the direction orthogonal to the second direction continuously changes along the direction orthogonal to the second direction.

13. The conductive member for a touch panel according to claim 1, wherein an intersecting angle between the first direction and the second direction is 60° or more and 80° or less.

14. The conductive member for a touch panel according to claim 1,
wherein the first thin metal wire has a linear shape between intersections with two of the second thin metal wires adjacent to each other,
wherein the second thin metal wire has a linear shape between intersections with two of the first thin metal wires adjacent to each other,
wherein the third thin metal wire has a linear shape between intersections with two of the fourth thin metal wires adjacent to each other, and
wherein the fourth thin metal wire has a linear shape between intersections with two of the third thin metal wires adjacent to each other.

15. The conductive member for a touch panel according to claim 1,
wherein the first thin metal wire has a curved shape between intersections with two of the second thin metal wires adjacent to each other,
wherein the second thin metal wire has a curved shape between intersections with two of the first thin metal wires adjacent to each other,
wherein the third thin metal wire has a curved shape between intersections with two of the fourth thin metal wires adjacent to each other, and
wherein the fourth thin metal wire has a curved shape between intersections with two of the third thin metal wires adjacent to each other.

16. The conductive member for a touch panel according to claim 1, wherein the transparent insulating member consists of a transparent substrate.

17. The conductive member for a touch panel according to claim 16, wherein the transparent substrate is a flexible film.

18. The conductive member for a touch panel according to claim 1,
wherein the transparent insulating member consists of an insulating layer,
wherein the conductive member further comprises a transparent substrate, and
wherein the first mesh-shaped electrode, the second mesh-shaped electrode, and the insulating layer are disposed on one surface of the transparent substrate.

19. A touch panel comprising:
the conductive member for a touch panel according to claim 1.

20. A touch panel display device comprising:
the touch panel according to claim 19; and
a display module.

* * * * *